Nov. 10, 1925.    F. E. GARBUTT ET AL    1,560,908
INTERMITTENT MOVEMENT
Filed March 10, 1923
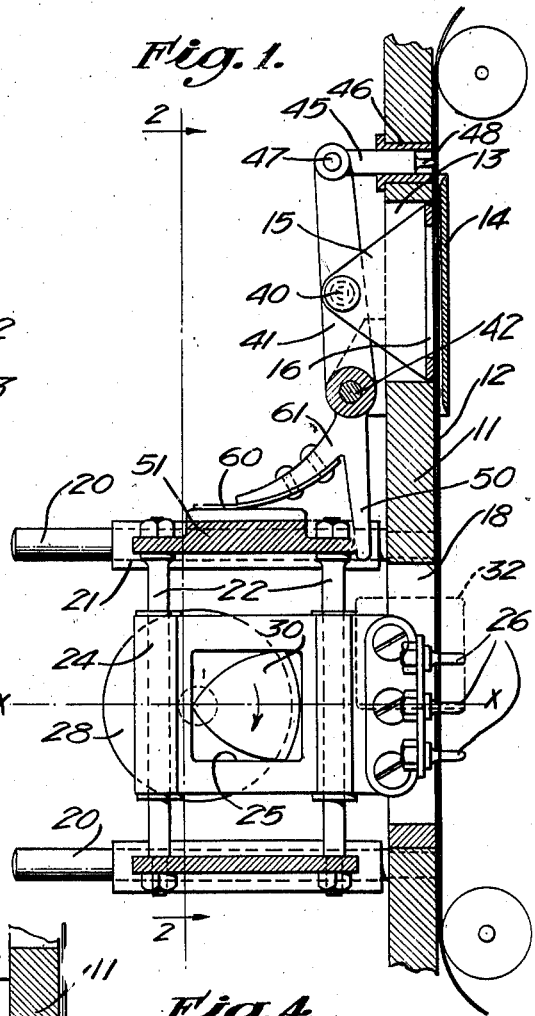
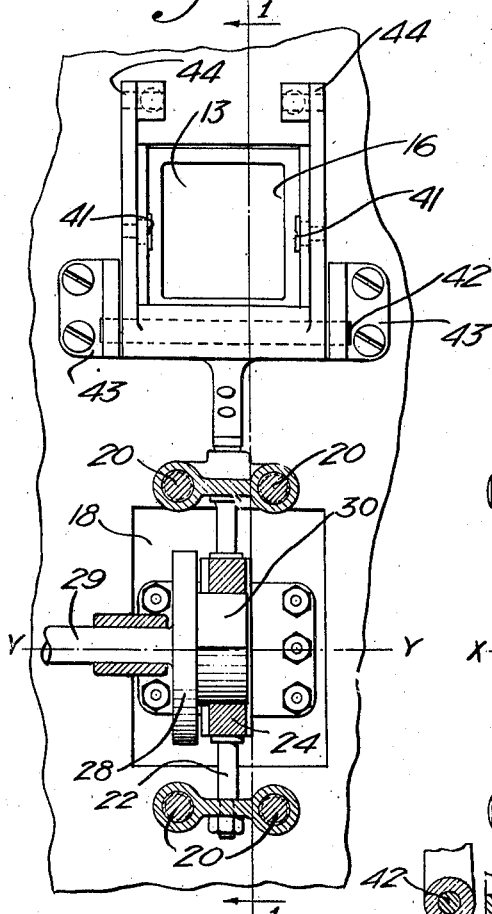
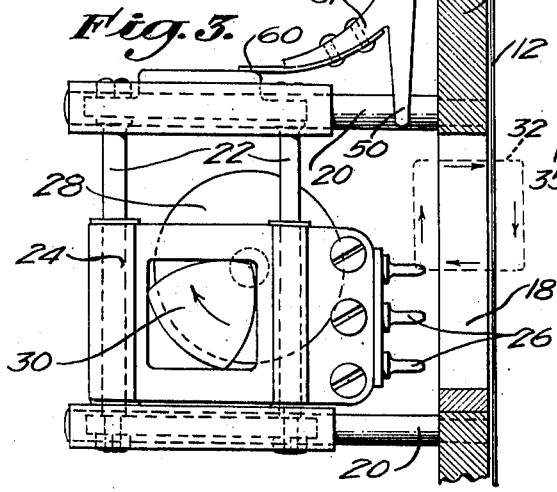
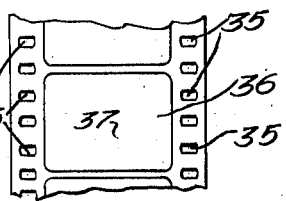
INVENTORS:
FRANK E. GARBUTT,
RALPH G. FEAR,
BY
ATTORNEYS.

Patented Nov. 10, 1925.

1,560,908

UNITED STATES PATENT OFFICE.

FRANK E. GARBUTT AND RALPH G. FEAR, OF LOS ANGELES, CALIFORNIA, ASSIGNORS TO FAMOUS PLAYERS-LASKY CORPORATION, A CORPORATION OF NEW YORK.

INTERMITTENT MOVEMENT.

Application filed March 10, 1923. Serial No. 624,280.

*To all whom it may concern:*

Be it known that we, FRANK E. GARBUTT and RALPH G. FEAR, both citizens of the United States, residing at Los Angeles, in the county of Los Angeles and State of California, have invented a new and useful Intermittent Movement, of which the following is a specification.

This invention relates to mechanical movements and is of particular utility in motion picture industry as means for intermittently advancing a film strip in various motion picture apparatus.

In the motion picture art, photographic images are formed on transparent film in consecutive and evenly spaced order. In the making of a negative film, consecutive images of a changing scene are impressed upon a sensitized film strip, by intermittently advancing consecutive portions, or frames, of the film strip before an objective lens arrangement provided with a shutter which is synchronized with the movement of the film. In the showing of motion pictures upon the screen, a positive film is carried through a projecting machine in substantially the same manner as a negative film is employed in the camera. In this instance the film is intermittently advanced within the projecting machine in such a manner that the frames thereof are consecutively brought before an aperture which is provided with a projecting lens.

In both the above cases, it is necessary that the consecutive frames be held stationary before the light aperture throughout the time that the shutters allow light to pass, in order that, in the first instance, a photographic image may be impressed upon a stationary sensitized surface, and in the second instance, that the projecting light beam will pass through a stationary positive frame or image, so that in either case no blurring of the image will take place.

It is an object of the invention to provide an intermittent movement having a variety of usages, but being of particular utility in the motion picture industry.

It is a further object thereof to provide such an intermittent movement in which the time consumed in the advance of the film constitutes an extremely small portion of the full period.

It is a further object of the invention to provide in such device a means for clamping the film strip so that it will be immovable except when being advanced.

The special advantages of our invention and further objects thereof will be made evident hereinafter.

Referring to the drawing which is for illustrative purposes only,

Fig. 1 is a vertical section through a device embodying our invention, this section being taken upon a plane represented by the line 1—1 of Fig. 2.

Fig. 2 is an elevation of the device shown in Fig. 1, being partially sectioned upon a plane represented by the line 2—2 of Fig. 1.

Fig. 3 is a fragmentary sectional view similar to Fig. 1 showing the parts disposed in another position.

Fig. 4 is a view showing a section of a film such as employed in the motion picture industry, and which, the intermittent movement shown, is adapted to advance through a motion picture apparatus.

In the drawing we show a vertical mounting plate 11 across which a film 12 is adapted to travel. This mounting plate may be employed in various motion picture devices such as a camera, projecting machine, or printer. In the plate 11 we provide an aperture 13 across which the film strip 12 is intermittently moved. In this aperture 13 a clamping member 15 is placed which is adapted to clamp the film firmly against a backing plate 14. Assuming the film strip 12 to be sensitized, it would be possible to project the images consecutively thereupon by the standard shutter and lens arrangement, not shown, through the opening 16 in the clamp 15.

Below the aperture 13 an opening 18 is provided and horizontal slide members consisting of bars 20 are mounted above and below the opening 18. Upon the bars 20 a carriage or traveler 21, which provides vertical slides 22, is slidably placed. Upon these vertical slides 22 an engagement element 24 is disposed, having a substantially square opening 25 therein which has engagement fingers 26 mounted at the forward end thereof. Upon a plate 28 formed upon the end of a shaft 29, a triangular cam 30 is situated which extends into the opening 25, and cooperates with the opening 25 in giving the engagement element 24 a rectangular motion as indicated by the dotted lines 32 in Figs. 1 and 3. This dotted line 32 indicates the shape of the path of any point in the member 24, and is in particular the path described by the point of the upper finger 26. The fingers 26 are arranged in two vertical rows, three fingers in each row, and are adapted to engage perforations 35 in the edges of a film strip such as indicated at 36 in Fig. 4. The depth of the square 32 which the member 24 describes is equal to the space between the frames 37 of the film 36. In Fig. 1 the fingers 26 are shown in engagement with the film and at a point in their downward travel. The position in which the member 24 is shown in Fig. 3 is at the end of its rearward travel preliminary to starting the upward travel.

It will be perceived that the downward travel of the member 24 is one-fourth the full travel thereof, owing to the fact that the downward travel represents one side of the square 32. It will then be understood that as the plate 28 revolves and rotates the cam 30, as indicated by the arrows thereupon, the member 24 will continuously describe a square 32, and in so doing the fingers 26 thereof will engage the film 11 just previous to the starting of the member 24 upon its downward travel, and during its downward travel will advance the film one frame. It will be perceived that the corners of the square 32 are slightly curved and that the downward travel starts slightly before the member reaches the end of its forward travel and in order to compensate for this, the fingers 26 are made of sufficient length that they will be fully engaged before the member 24 starts downward.

The triangular cam 30 is commonly called harmonic owing to the harmonic movement it provides. By its use a gradual start and an intermediate maximum speed with a retardation in the finish of the stroke is accomplished which is highly desirable in motion picture work in order that sudden stresses upon the film 12 be kept away from.

The clamping member 15 is pivotally attached at 40 to an arm 41 which is bifurcated at the upper end and is pivotally mounted upon the plate 11 by a shaft 42 which extends through brackets 43. At the upper bifurcated ends 44 of the arm 41 stop pins 45, which operate through bushings 46 placed in the plate 11, are turnably mounted upon pins 47. The ends of the members 45 are formed to provide fingers 48 which engage perforations in the edge of the film 12, when the ends 44 of the arm 41 are allowed to advance inwardly. The lower end 50 of the arm 41 extends down into the path of the upper plate 51 of the carriage 21 so that whenever the carriage is in the advanced position as shown in Fig. 1, the end 50 is moved forwardly and the upper end of the arm swung away from the plate 11, thus drawing the fingers 48 out of engagement with the film 12 and moving the clamping plate 15 away from the plate 14, thus leaving the film free to travel downwardly under engagement of the fingers 26 of the member 24. The clamping plate 15 and the pins 45 are normally maintained in a position of engagement with the film by a spring 60 which rests upon the top of the traveler 21, and which is attached to a bracket 61 formed upon the arm 41. The provision of two sets of perpendicularly disposed slides, such as 20 and 22, which are parallel to the plane through which the cam 30 and the member 24 move, provide a means for maintaining the member 24 pointed in a substantially horizontal direction at all times during its movement no matter what position it may assume in its plane of movement. In other words, an axis such as the horizontal axis $x$—$x$ through the member 24, is maintained, by the system of slides 20 and 22, in a position parallel to a plane which extends perpendicularly to the plane in which the member 24 moves, or in other words a plane indicated by the line $y$—$y$ in Fig. 2. By this means the fingers 26 are maintained perpendicular to that portion of the film 12 which is disposed before the opening 18, thus assuring the proper and facile engagement of the film by the fingers 26.

A particular advantage of the intermittent movement shown is that the period of intermission is substantially three-fourths of the complete cycle of the engagement element, thus allowing a comparatively long time for the action of the shutters and making it possible to vary, between the minimum and maximum limits, the length of time during which the film is exposed to light.

A further advantage in the device is that the film is securely clamped during this intermission, thus assuring that no movement thereof will take place during its exposure to light.

We claim as our invention:

1. In an intermittent movement, the combination of: a forwardly movable member; an engagement element adapted to intermittently engage and advance said movable member; a clamp for holding said movable member immovable during the intermission between the intermittent advance of said movable member by said engagement element, a pivoted member adapted to be moved by unsecured contact of said engagement element therewith; stop pins pivotally disposed on said pivoted member, said stop pins being adapted to engage perforations in said movable member; and means for withdrawing said stop pins from said perforations.

2. In an intermittent movement, the combination of: a film; guide means providing a path for the movement of said film; slides mounted perpendicularly to said path; a traveler disposed upon said slides and having slides thereupon extending substantially perpendicular to said first named slides; a member disposed upon said second named slides having means thereupon for engaging said film; means for imparting a rectangular movement to said member so that said member will intermittently engage and advance said film; a clamp for holding said film stationary during the periods between the advance of said film, said clamp comprising an arm pivoted at a point between its ends, said point being so located that the inner end of said arm is engaged and depressed by said traveler during the advance of said film by said member; and a clamp plate upon the outer end of said arm adapted to bear against said film when said inner end of said arm is not engaged by said traveler.

3. In an intermittent movement, the combination of: a film; guide means providing a path for the movement of said film; slides mounted perpendicular to said path; a traveler disposed upon said slides and having slides thereupon extending substantially perpendicular to said first named slides; a member disposed upon said second named slides having means thereupon for engaging said film; means for imparting a rectangular movement to said member so that said member will intermittently engage and advance said film; a clamp for holding said film stationary during the periods between the advance of said film, said clamp comprising an arm pivoted at a point between its ends, said point being so located that the inner end of said arm is engaged and depressed by said traveler during the advance of said film by said member; a clamp plate upon the outer end of said arm adapted to bear against said film when said inner end of said arm is not engaged by said traveler; and resilient means for holding said clamp plate against said film.

4. A device, as in claim 3, in which said member has a rectangular opening therein, and in which said means for imparting a rectangular movement comprises a triangular cam engaging said opening, and means for suitably rotating said cam.

5. In an intermittent movement, the combination of: a film; guide means providing a path for the movement of said film; slides mounted perpendicular to said path; a traveler disposed upon said slides and having slides thereupon extending substantially perpendicular to said first named slides; a member disposed upon said second named slides having means thereupon for engaging said film; means for imparting a rectangular movement to said member so that said member will intermittently engage and advance said film; a clamp for holding said film stationary during the periods between the advance of said film, said clamp comprising an arm pivoted at a point between its ends, said point being so located that the inner end of said arm is engaged and depressed by said traveler during the advance of said film by said member; a clamp plate upon the outer end of said arm adapted to bear against said film when said inner end of said arm is not engaged by said traveler; resilient means for holding said clamp plate against said film, said member having a rectangular opening therein, said means for imparting a rectangular movement comprising a triangular cam adapted to move against the sides of said rectangular opening; means for rotating said cam; and stop pins on said arm for engaging perforations in said film during the periods between the periods of advance of said film by said member.

6. In an intermittent movement, the combination of: a forwardly movable member; an engagement element member adapted to engage and advance said movable member; a pivoted member arranged to be moved by unsecured contact of said engagement element therewith; stop pins disposed on said pivoted member, said stop pins being arranged to engage perforations in said movable member but being disengaged from said perforations when said pivoted member is moved; and resilient means for returning said pivoted member to its initial position.

7. In an intermittent movement as described in claim 6 in which said engagement element engages and moves said pivoted member slightly before the intermittent advance of said movable member.

8. In an intermittent movement, the combination of: a forwardly movable member; an engagement element member adapted to engage and advance said movable member; a pivoted member arranged to be moved by unsecured contact of said engagement element therewith; stop pins disposed on said pivoted member, said stop pins being arranged to engage perforations in said movable member but being disengaged from said perforations when said pivoted member is moved; and spring means for returning said pivoted member to initial position.

9. An intermittent movement as described in claim 8 in combination with a clamp member for clamping said movable member, said clamp being disposed on said pivoted member.

10. In an intermittent movement, the combination of: a film; a horizontal slide comprising members spaced apart; a traveler slidably arranged on said horizontal slide, said traveler comprising a pair of vertical bars spaced apart; an engagement element slidable on said vertical bars, said element having means for engaging said film; means for moving said engagement element in a manner to intermittently advance said film; a pivoted member adapted to be moved by unsecured contact of said engagement element therewith; stop pins pivotally disposed on said pivoted member, said stop pins being adapted to engage perforations in said film; and means for withdrawing said stop pins from said perforations.

11. In an intermittent movement, the combination of: a film; a horizontal slide comprising members spaced apart; a traveler slidably arranged on said horizontal slide, said traveler comprising a pair of vertical bars spaced apart; an engagement element slidable on said vertical bars, said element having means for engaging said film; means for moving said engagement element in a manner to intermittently advance said film; means for clamping said film when said film is at rest; a pivoted member adapted to be moved by unsecured contact of said engagement element therewith; stop pins pivotally disposed on said pivoted member and having continuously a horizontal motion when said film is vertical, said stop pins being adapted to engage perforations in said films; and means for withdrawing said stop pins from said perforations.

12. In an intermittent movement, the combination of: a film; a horizontal slide comprising cylindrical members spaced apart; a traveler slidably arranged on said horizontal slide, said traveler comprising a pair of vertical bars spaced apart; an engagement element slidable on said vertical bars, said element having means for engaging said film; means for moving said engagment element in a manner to intermittently advance said film; a clamp member arranged to clamp said film when said film is at rest; stop pins arranged to engage perforations in said film when said film is at rest; a pivoted member supporting said clamp and said stop pins and pivotally secured to said stop pins; guides having apertures through which said pins pass into apertures of said film, said pivoted member being arranged to be swung by unsecured contact of said engagement element therewith so as to remove said clamp and said stop pins from engagement with said film during the motion thereof.

In testimony whereof, we have hereunto set our hands at Los Angeles, California, this 3rd day of March 1923.

FRANK E. GARBUTT.
RALPH G. FEAR.